US007743153B2

(12) United States Patent
Hall et al.

(10) Patent No.: US 7,743,153 B2
(45) Date of Patent: Jun. 22, 2010

(54) KILLING LOGIN-BASED SESSIONS WITH A SINGLE ACTION

(75) Inventors: Kylene J. Hall, Austin, TX (US); Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1162 days.

(21) Appl. No.: 11/334,670

(22) Filed: Jan. 18, 2006

(65) Prior Publication Data

US 2007/0169175 A1 Jul. 19, 2007

(51) Int. Cl.
G06F 15/16 (2006.01)
(52) U.S. Cl. ............... 709/227; 709/228; 709/229; 713/164; 713/185
(58) Field of Classification Search .......... 709/228, 709/229, 227; 713/164, 185
See application file for complete search history.

(56) References Cited

U.S. PATENT DOCUMENTS

| 5,774,551 | A * | 6/1998 | Wu et al. .................. 713/155 |
| 6,108,591 | A * | 8/2000 | Segal et al. ................. 701/1 |
| 6,928,440 | B2 | 8/2005 | Cordray et al. |
| 2002/0138728 | A1* | 9/2002 | Parfenov et al. ............ 713/170 |
| 2002/0169967 | A1* | 11/2002 | Varma et al. ............... 713/185 |
| 2003/0110266 | A1* | 6/2003 | Rollins et al. .............. 709/227 |
| 2003/0149781 | A1* | 8/2003 | Yared et al. ................ 709/229 |
| 2004/0049673 | A1* | 3/2004 | Song et al. ................. 713/150 |
| 2004/0128393 | A1* | 7/2004 | Blakley et al. .............. 709/229 |
| 2004/0128506 | A1* | 7/2004 | Blakley et al. .............. 713/170 |
| 2004/0158743 | A1* | 8/2004 | Ham et al. .................. 713/201 |
| 2004/0225878 | A1* | 11/2004 | Costa-Requena et al. ... 713/150 |
| 2006/0075224 | A1* | 4/2006 | Tao ............................ 713/164 |
| 2007/0162605 | A1* | 7/2007 | Chalasani et al. ........... 709/227 |

FOREIGN PATENT DOCUMENTS

WO    WO 2006/065004    *  6/2006

OTHER PUBLICATIONS

Kristol et al, "RFC 2109—HTTP State Management Mechanism", Feb. 1997, 17 pages, available online at <<http://www.faqs.org/rfcs/rfc2109.html.

* cited by examiner

Primary Examiner—William C Vaughn, Jr.
Assistant Examiner—Boris Gorney
(74) Attorney, Agent, or Firm—Matthew W. Baca; Amy J. Pattillo (57) ABSTRACT

A method, system, and program are provided for killing login-based sessions with a single action. In addition to issuing a session token to a client system upon login by a user to a network service, a personal token is issued to the client system. The personal token is executable at the client system to trigger accesses to a personal session controller and to automatically disallow the session token if the personal session controller indicates that the personal token is deactivated. The personal session controller enables an interface through which a user is enabled select to deactivate all active personal tokens with a single action, such that a user manages killing login-based sessions independent of the server system authorizing each login-based session and independent of the client system to which the login-based session was authorized.

20 Claims, 6 Drawing Sheets

KILLING LOGIN-BASED SESSIONS WITH A SINGLE ACTION

BACKGROUND OF THE INVENTION

1. Technical Field

The present invention relates in general to improved network security and in particular to enabling a user to kill login-based sessions at a local or remote system with a single action.

2. Description of the Related Art

Network users are often required to properly login to access data or services from another system via the network. Often, using a network based login, a particular user can login via multiple different systems connected to a network, to access a same set of data or services from a server system.

Each system providing the data or services may implement different levels of security in association with a login. Once the login data entered by a user is verified, the system providing access to data and services enables a session in which the client system at which the user logs in is enabled to access the data and services. To enable a session, some servers pass a session token, also termed a cookie, to the requesting client system to identify the session and set parameters for the session. Where the system provides a client system access to commercial transactions and data, the session token may specify that if no activity within a browser window opened to the commercial transaction is detected within a particular time period, then the session is to terminate.

With the number of logins that a user may perform in a particular day and the number of different client systems from which a user may login, a user may lose track of whether all opened session have been logged out of when the user leaves a particular system. While some servers passing a session token may include a time limit for inactivity after which a session automatically terminates, a user may still be concerned about whether another person could still be accessing the user login for secure access prior to termination. Further, even if a user logs out of a session at a particular client system, the user may not have closed all windows with data associated with the session, leaving that data accessible to a next person using the client session.

Therefore, in view of the foregoing, it would be advantageous to enable a user to kill all session tokens and all windows open in association with a login-based session, with a single action, whether the login-based sessions are all opened from one client system or multiple client systems. Further, it would be advantageous to enable a user to kill session tokens and open windows at one client system from another client system.

SUMMARY OF THE INVENTION

Therefore, the present invention provides improved network security by enabling a user to kill login-based sessions at one or more computing systems with a single action.

In one embodiment, server systems authorizing login-based sessions for a particular user login each issue a session token for each login-based session to each requesting client system at which the user logs in. Separately, for each login authorization, a personal session controller is triggered to issue a personal token associated with each session token. A personal token at a client system triggers the client system to access the personal session controller to request a status of the personal token and the personal token automatically disallows the associated session token if the personal session controller indicates the personal token status is deactivated. A user is enabled to select to deactivate all personal tokens through an interface enabled by the personal session controller at a client system through which the user accesses the personal session controller. The interface includes a selectable option for the particular user to select to deactivate all of the currently activate personal tokens with a single action. Thus, through user access to the personal session controller the user can manage each login-based session independent of the server system authorizing each login-based session and independent of the client system at which the particular user logged in and triggered the login-based session.

A login controller for a server may be enabled, upon detection of a user login request, to detect a network address of the personal session controller specified by the user for managing personal tokens and trigger the personal session controller at the network address to issue a personal token. In addition, a login controller for a server may trigger the personal session controller to issue a personal token upon detection of a login request with a traveling user ID that indicates the user automatically requests a personal token or from a regular user ID with a selected option to request a personal token. Further, personal session controller may monitor for session tokens received at a particular client system and trigger issue of a personal token in association with each detected session token.

In addition to a personal token disallowing a session token upon the personal token detecting a status of inactive returned from the personal session controller, a personal token detects whether expiration rules are triggered by current conditions and automatically disallows an association session token when expiration rules for the personal token are triggered.

In addition to a personal token disallowing a session token, a personal token may perform other destruction settings. Destruction settings may specify automated closing of any windows opened in association with the session token, automated destruction of the session token, automated disallowing of the personal token and automated destruction of the session token, where destruction of a token removes the token from memory at least at the requesting client system.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
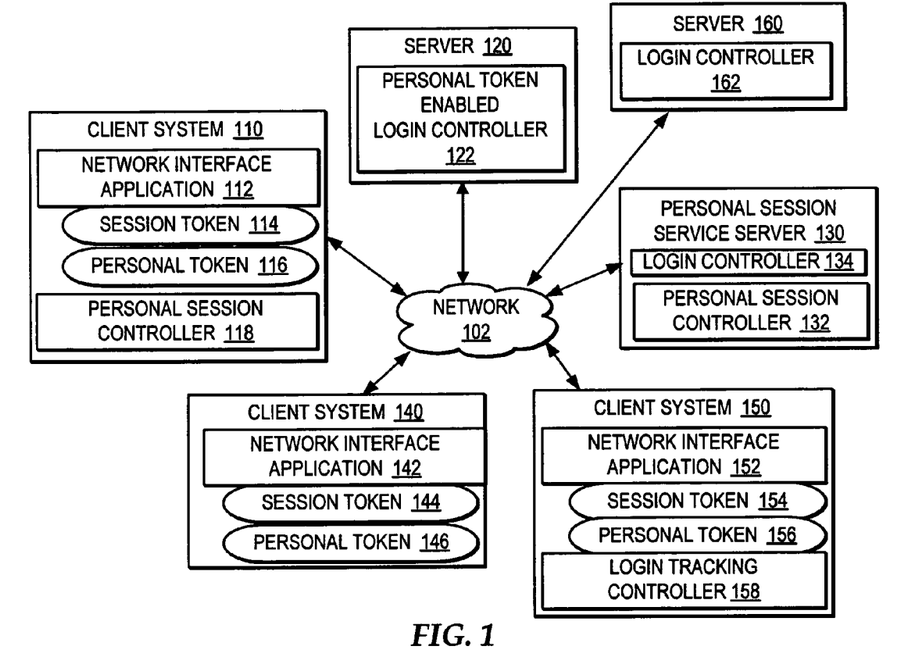
FIG. 1 is a block diagram depicting a network environment in which the present invention may be implemented.

With reference now to FIG. 1, a block diagram depicts a network environment in which the present invention may be implemented. As illustrated, multiple systems may be communicatively connected via a network 102, which is the medium used to provide communications links between various devices and computer communicatively connected. Network 102 may include permanent connections such as wire or fiber optics cables and temporary connections made through telephone connections and wireless transmission connections, for example. Network 102 may represent local area and wide area networks and public and private networks. It will be understood that FIG. 1 is representative of one example of a distributed communication network for supporting network sessions; other types of network-facilitated accesses may also be supported and other types of distributed networks may be implemented.

In one embodiment, a server system providing a network service, such as server 120, server 160, or personal session service server 130 requires a user to properly login to receive access to the server. In one example, at server 120, a personal token enabled login controller 122 controls the login process via a network interface application at the client system and distributes a session token to the client system from which a user is logging in, such as client system 110, client system 140 or client system 150. A network interface application, such as network interface application 112, network interface application 142, and network interface application 152 may include multiple types of applications and executables enabled to facilitate an interface between a client system and a server or another client system for a network communication. In one example, a network interface application is a browser application. In another example, a network interface application is an instant messaging application. Further, it will be understood that other types of network interface applications may enable an interface for user interaction with a server via a client system.

It is important to note that personal token enabled login controller 122, login controller 162, or login controller 134, may implement different types of login procedures to enable a user to access a particular service provided by server 120, server 160, or personal session service server 130 or one or more other server systems. In one example, a user may enter a user ID and a password via a login interface through network interface application 142 at a client system to login and personal token enabled login controller 122 verifies whether the user ID and password match the user's record. In another example, a login controller may require biometric based caller authentication for a login. Further, it will be understood that additional or other types of login procedures may be implemented.

In one embodiment, with a proper login, a login controller handling the login issues the requesting client system a session token. For example, server 120 includes personal enabled login controller 122, server 160 includes login controller 162, and personal session service server 130 includes login controller 134. Session tokens issued by a login controller may include, for example, session token 114, session token 144, and session token 154. The session token may include a login verification number, an access level allowed for the user, an expiration time for the session, a maximum inactivity time before expiration of the session, and other parameters for enabling control of the login-based session allowed to a user at a client system. In addition, it will be understood that additional or other types of information may be included in a session token. Further, it will be understood that in addition to or alternative to a session token, other session management tools may be implemented.

In another embodiment, client systems communicate in a peer-to-peer environment. For example, network interface application 112 and network interface application 142 may enable a peer-to-peer communicative connection between client system 110 and client system 140. Although not depicted, a browser or other controller at a client system may include a login controller that restricts the peer-to-peer communicative connection to users who properly login and receive a session token.

It is important to note that the session enabled between a network interface application and a server may implement different levels of security for the data transfers in the session. In one example, additional data security is implemented using the Secure Socket Layer (SSL). It will be understood that other network layers and levels of security may be implemented for a session.

Advantageously, in addition to passing a session token upon login to enable a session, a personal token is generated and passed to the client system requesting the login, where the personal token enables the login user to control the security of a session. In particular, in contrast to a session token which is typically defined by and controlled by a server or other system with the data to be accessed, a personal token is defined by and controlled by a user accessing the data, enabling the user to remotely kill a session, including, but not limited to, deactivation of a session token and destruction of windows open in association with the session. It will be understood, however, that a session token and personal token may be integrated into a single token, generated by a login controller or other controller that defines the token to enable a user to remotely control the login-based session through the token.

In the embodiment, a personal session controller, such as personal session controller 118 or personal session controller 132, detects that a login request is made, generates a personal token and passes the personal token to the requesting client system. In one example, personal session controller 118 or personal session controller 132 detects that a login request is made from a login controller enabled to trigger the request for a personal token upon login. For example, personal token enabled login controller 122 is enabled to trigger a personal session controller at a system remote from server 120 to generate a personal token. In addition, in another embodiment, personal token enabled login controller 122 may be enabled to generate both a session token and personal session controller as separate tokens or integrated into a single token.

Where a login controller is not enabled to trigger a personal session controller, a separate login tracking controller running at the login system or at the client system may detect logins and trigger a personal session controller to generate a personal token. For example, client system 150 includes login tracking controller 158 which tracks logins by users at client system 150 and automatically triggers a particular personal session controller to generate a personal token. In one example, in an enterprise or private business network environment, login tracking controller 158 may access a database that specifies, for each login ID, which personal session controller to trigger to generate a personal token.

In another example, a user may remotely login to personal session controller 132 through login controller 134 and request to download login tracking controller 158 to a particular system or otherwise enable personal session controller 132 to monitor login requests from client system 150 to any login controller and trigger personal session controller 132 to generate a personal token. When a user logs into services from a client system that is outside a trusted network, such as a client system at a public venue, the user may first login to personal session service server 130 to enable personal session controller 132 to generate a personal session token for each login at the public client system and then enable a user to insure deactivation of all logins at the public client system from the public client system or from another system through which the user logs in to personal session controller 132.

Further, in another example, when a user signs up for a new service that requires a login, the service may prompt the user to select a personal session controller or may automatically select a personal session controller. For example, if server 120 provides the service for an email service provider, personal token enabled login controller 122 may automatically trigger a third party providing personal session controller 132 to perform the personal session token generation. In another example, personal session controller 132 may enable a user to record a listing of login identifiers and passwords and personal session controller 132 may automatically contact the login controller for each of the login identifiers and request setting the personal session controller to personal session controller 132.

Personal tokens, such as personal token 146 at client system 140, monitor data requests in association with a session token, such as session token 144. For each detected data request or other condition, triggers a request to a particular personal session controller specified in personal token 146 to ask for permission for the data request. A personal session controller maintains a status for each personal token as either active or deactivated. The user may access and adjust the status of all or a portion of the active personal tokens to from active to deactivated with a single action request sent to the personal session controller. If the personal session controller receives a permission request from a client system for a personal token marked as active, then the personal session controller returns a response to the requesting client system providing permission. If the personal session controller receives a permission request for a personal token marked as deactivated, then the personal session controller returns a response to the requesting client system without permission. When the personal token at the requesting client system receives a response indicating a lack of permission, the personal token then performs a particular selection of destruction settings, including, but not limited to, deactivating the session token, destroying all windows open in association with the session token, and self-scrubbing the personal token from the client system.

In another example, a personal token at a client system monitors conditions, such as a current time, a period of inactivity, and a number of data requests, and upon the occurrence of a particular condition, the personal token expires. Upon expiration of the personal token, the personal token performs the particular selection of destruction settings.

In one example, a session token or personal token may be data that an application at the client system, such as network interface application 112, network interface application 142, or network interface application 152, uses to control a session. In another example, a session token or personal token may be implemented through a cookie, javascript, or other executable that when passed to the client system executes on the client system to control the session. It will be understood by one with skill in the art that additional or alternate types of data and executables may manage sessions between systems.

A personal session controller, such as personal session controller 118, personal token enabled login controller 122, or personal session controller 132, facilitates user access to a listing of the current personal tokens issued from logins by the user. For example, a user logs in at client system 140 and personal session controller 118 issues personal token 146 and then a user logs on at client system 150 and login tracking controller 158 triggers personal session controller 118 to issue personal token 156. A user then returns to client system 110 and logs in to access personal session controller 118. The user requests an inventory of the current active personal tokens and personal session controller 118 facilitates a user interface listing entries for personal token 146 and personal token 156. The user may select to deactivate all the personal tokens or one of the personal tokens with a single action. If a next permission request is received from one of the deactivated tokens at personal session controller 118, personal session controller 118 returns a message indicating a lack of permission and the deactivated personal token will perform the personal token destruction settings.

In one embodiment, a personal session controller may issue a short-lived personal token. A short-lived personal token includes expiration rules and destruction settings, such that when the short-lived personal token detects one of the expiration rules set, the short-lived personal token performs the destruction settings. In one example, where server 120 manages a distributed file system, a session token often includes a session token that is time limited. Personal token enabled login controller 122 may also issue a short-lived personal token that is time limited, but the time limit is specified by the user for shortening the accessible time limit.

Figure 2:
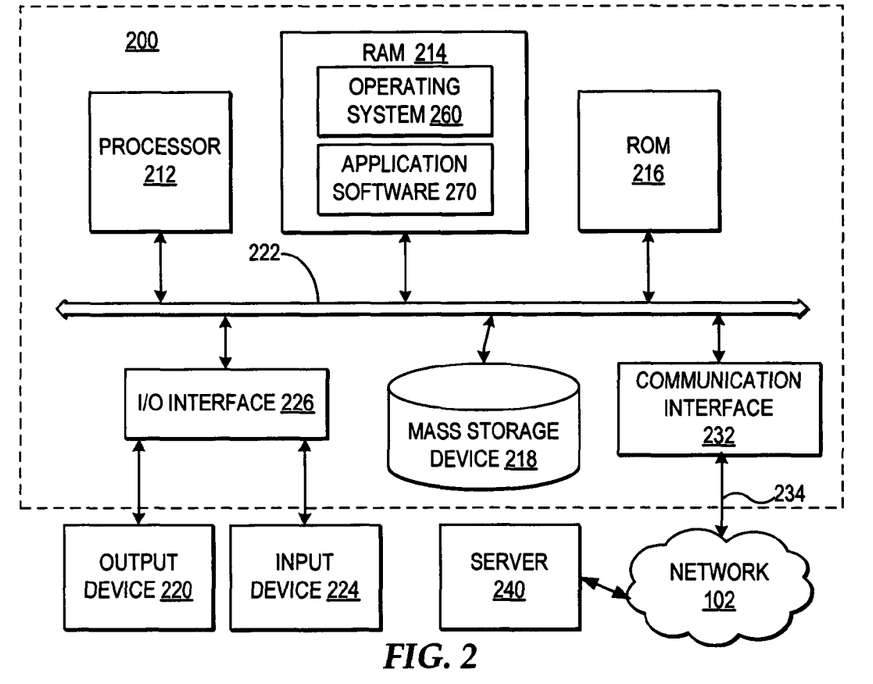
FIG. 2 is a block diagram illustrating a computing system in which the present invention may be implemented.

Referring now to FIG. 2, a block diagram illustrates a computing system in which the present invention may be implemented. The present invention may be executed in a variety of systems, including a variety of computing systems and electronic devices.

Computer system 200 includes a bus 222 or other communication device for communicating information within computer system 200, and at least one processing device such as processor 212, coupled to bus 222 for processing information. Bus 222 preferably includes low-latency and higher latency paths that are connected by bridges and adapters and controlled within computer system 200 by multiple bus controllers. When implemented as an email server, computer system 200 may include multiple processors designed to improve network servicing power.

Processor 212 may be a general-purpose processor such as IBM's PowerPC™ processor that, during normal operation, processes data under the control of an operating system 260, application software 270, middleware (not depicted), and other code accessible from a dynamic storage device such as random access memory (RAM) 214, a static storage device such as Read Only Memory (ROM) 216, a data storage device, such as mass storage device 218, or other data storage medium. Operating system 260 may facilitate a graphical user interface (GUI). In one embodiment, application software 270 may contain machine executable instructions that when executed on processor 212 carry out one or more of the operations depicted in the flowcharts and other operations described herein. Alternatively, the steps of the present invention might be performed by specific hardware components that contain hardwired logic for performing the steps, or by any combination of programmed computer components and custom hardware components.

The personal session controller, login controller, tokens, and other executables of the present invention may be provided as a computer program product, included on a machine-readable medium having stored thereon the machine executable instructions used to program computer system 200 to perform a process according to the present invention. The term "machine-readable medium" as used herein includes any medium that participates in providing instructions to processor 212 or other components of computer system 200 for execution. Such a medium may take many forms including, but not limited to, non-volatile media and volatile media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 400 can read and which is suitable for storing instructions. In the present embodiment, an example of a non-volatile medium is mass storage device 218 which as depicted is an internal component of computer system 200, but will be understood to also be provided by an external device. Volatile media include dynamic memory such as RAM 214.

The program instructions may be transferred from a remote computer such as a server 240 to requesting computer system 200 via a network link 234 (e.g. a modem or network connection) to a communications interface 232 coupled to bus 222. Communications interface 232 provides a two-way data communications coupling to network link 234 that may be connected, for example, to a local area network (LAN), wide area network (WAN), or directly to an Internet Service Provider (ISP). In particular, network link 234 may provide wired and/or wireless network communications to one or more networks, such as network 140.

Network link 234 and network 140 both use electrical, electromagnetic, or optical signals that carry digital data streams. The signals through the various networks and the signals on network link 234 and through communication interface 232, which carry the digital data to and from computer system 200, are forms of carrier waves transporting the information.

When implemented as a network server, computer system 200 may include multiple communication interfaces accessible via multiple peripheral component interconnect (PCI) bus bridges connected to an input/output controller. In this manner, computer system 200 allows connections to multiple network computers via multiple separate ports.

In addition, computer system 200 typically includes multiple peripheral components that facilitate communication. These peripheral components are connected to multiple controllers, adapters, and expansion slots, such as input/output (I/O) interface 226, coupled to one of the multiple levels of bus 222. For example, input device 224 may include, for example, a microphone, a keyboard, a mouse, or other input peripheral device, communicatively enabled on bus 222 via I/O interface 226 controlling inputs. In addition, for example, a output device 220 communicatively enabled on bus 222 via I/O interface 226 for controlling outputs may include, for example, one or more graphical display devices, but may also include other output interfaces, such as an audio output interface. In alternate embodiments of the present invention, additional input and output peripheral components may be added.

Those of ordinary skill in the art will appreciate that the hardware depicted in FIG. 2 may vary. Furthermore, those of ordinary skill in the art will appreciate that the depicted example is not meant to imply architectural limitations with respect to the present invention.

Figure 3:
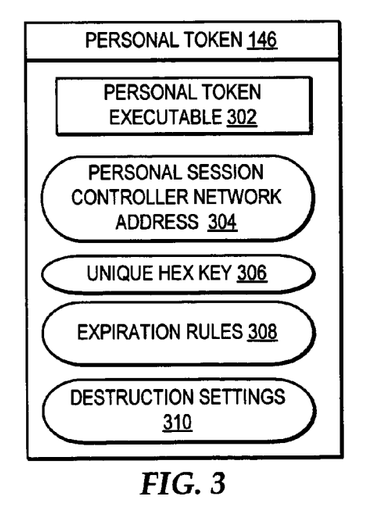
FIG. 3 is a block diagram depicting examples of components of a personal token.

With reference now to FIG. 3, personal token 146 depicts an example of components of a personal token; it will be understood however, that that although personal token 146 is illustrated with separate components, the separate components may be integrated into a single component and that additional or other components may be implemented in a personal token. In addition, it will be understood that the components of personal token 146 may be passed as integrated into standard communications between a server and a client or passed as separate communications between a server and a client.

In the example, a personal token 146 may include a personal token executable 302. In general, personal token executable 302 detects requests communication requests requiring secured access and responsive to detecting a communication request requiring secured access, determines the current status of a personal token and triggers destruction of windows, tokens, and other items for an expired personal token. In one example, personal token executable 302 may determine, from expiration rules 308 whether a personal token should automatically expire. In another example, personal token executable 302 may trigger a permission request to a personal session controller specified by personal session controller network address 304 using unique hex key 306 to identify the personal token. Responsive to personal token executable 302 detecting a status indicating lack of permission for the personal token or expiration of the personal token from the personal session controller, personal token executable 302 performs destruction settings 310. In one embodiment, personal token executable 302 is transferred with personal token 146. In another embodiment, personal token executable 302 already resides at the client system receiving personal token 146 and may include, but is not limited to, a browser application, plug-in to a browser application, a middleware application, and an operating system application programming interface.

Destruction settings 310 specify what additional data, windows, or executables should automatically be killed through being disallowed, closed or destroyed upon detecting deactivation of a personal token. In one example, a disallowed token still resides on the client system but no longer is authorized for a login-based session. In one example, a destroyed token is removed from system memory.

In one example, destruction settings 310 may specify to close all browser windows or all instant messaging session windows opened in association with the session for a disallowed session token. In another example, destruction settings 310 may specify to close all applicants opened in association with the session for a disallowed session token.

In particular, when the personal token performs the particular selection of destruction settings, the personal token may update the personal session controller with the actions performed. In addition, the personal token may monitor whether a session token is deactivated by a user logging out of a session and update the personal session controller if a logout is detected. With the updates, the personal session controller may automatically adjust the status of the personal token as maintained by the personal session controller.

In one example, personal token executable 302 may perform the following code instructions upon detection of a security access or other trigger condition:

```
if (date > expiration date)
{
    disallow session token, do not allow security access
}
else
{
    look at network address of the personal session controller
    contact the personal session controller
    send the uniq hex key and ask for permissions
    if (permissions not given OR deactivated)
    {
        disallow session token
        close any open browser windows requiring the security
        access
        scrub this personal token from the computer system
    }
}
```

Figure 4:
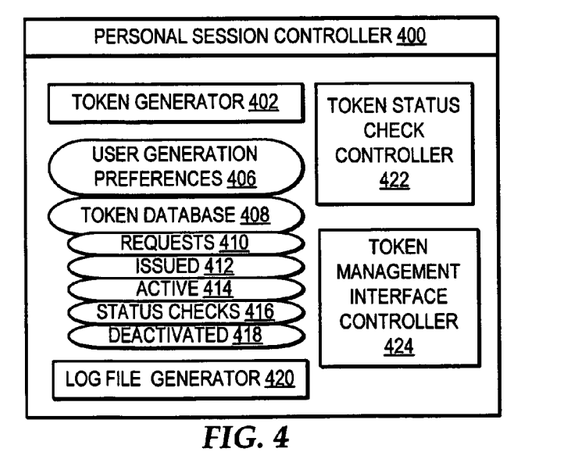
FIG. 4 is a block diagram illustrating one example of components of a personal session controller for issuing and managing personal tokens.

Referring now to FIG. 4, a block diagram depicts one example of components of a personal session controller for issuing and managing personal tokens. In the example, a personal session controller 400, which may be implemented by a client system, such as personal session controller 118, by a login server, such as personal token enabled login controller 122, or by an independent server system, such as personal session controller 132. It will be understood that personal session controller 400 may include additional or alternate components to those depicted in the example.

In the example, a token generator 402 detects prompts from login controllers or a login tracking controller to generate a personal token and pass the personal token to either the login controller or requesting client system. In particular, token generator 402 may generate personal tokens to meet user generation preferences 406. User generation preferences 406 may include multiple types of user preferences for the generation and management of personal tokens. For example, user generation preferences 406 may specify rules for setting expiration rules, rules for destruction settings, rules for selecting the personal session controller to handle the token checking, and other setting preferences.

A token database 408 includes multiple types of personal token data. In one example, token database 408 includes each token request 410 including an identifier for the requesting system, request date and time, and additional or alternate data related to a personal token request. For each request, token generator 402 generates a personal token with a unique hex key 306 and stores the unique hex identifier in issued tokens 412.

In addition, for each request, token generator 402 generates the token with a network address for the personal session controller to handle the token status checks and stores the network address in issued tokens 412. In generating the token with a network address, token generator 402 may select the network address for another personal session controller or for a particular system of a grouping of server system implementing personal session controller 400. In one example, server 130 represents a third party service provider that provides the services of personal session controller 132, where token generator 402 may assign a token to the network address of server 130 when user generation preferences 406 indicates a preference by a user for third party service.

Token generator 402 also generates tokens with an expiration date 308 and stores the expiration date for the token in issued tokens 412. In one embodiment, active tokens 414 include those tokens that are not deactivated by the user or by an expired expiration date. In particular, once an expiration date for a token marked as active expires, token database 408 automatically marks the token in deactivated tokens 418.

A user may request to access the status of all tokens as enabled by token management interface controller 424. In one example, token management interface controller 424 also includes a login controller for controlling user access to personal session controller 400. A user may login and request a listing of all tokens marked as active tokens 414. Token management interface controller 424 retrieves records for the requested tokens and updates a user interface accessible to the user with the records. The user may then interact with the user interface to select to deactivate all or a portion of the active tokens with a single action. In particular, token management interface controller 424 detects the selection by the user to deactivate all or a portion of the active tokens and automatically marks the selected tokens as deactivated tokens 418.

A client system receiving a personal token will contact personal session controller 400 with requests for permission to continue accessing data in a session. Token status check controller 422 receives each permission request, looks up the status of the personal token as identified by the hex key in the permission request, and returns the status, whether active or deactivated, to the requesting client system. Token database 408 may record a record for each status check received for each personal token in status checks 416.

A log file generator 420 may automatically or by user request generate a log file of all or portions of the data in token database 408. In particular, by creating log files of the data in token database 408, a user and personal session controller 400 may maintain a record of the personal token requests, personal tokens issued, activation periods for personal tokens, deactivation triggers and times for personal tokens, and status checks performed for personal tokens.

Figure 5:
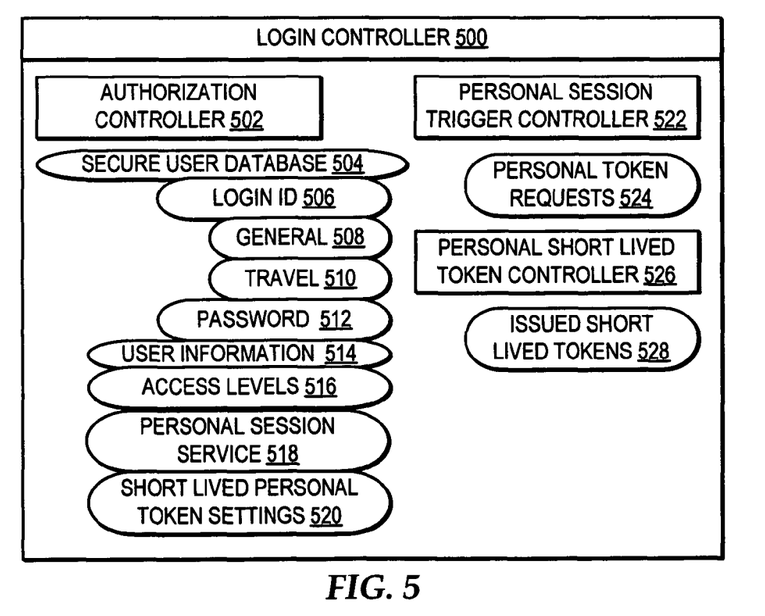
FIG. 5 is a block diagram depicting one example of components of a login controller enabled for triggering a personal session controller to issue a personal token.

Referring now to FIG. 5, a block diagram depicts one example of components of a login controller. As illustrated, login controller 500 includes multiple components which may be implemented by a server system, such as login controller 122 of server 120, or by a client system. In addition, although login controller 500 and personal session controller 400 are described as separate controllers, it will be understood that the controllers may be integrated into one controller.

In the example, login controller 500 includes an authorization controller 502. Authorization controller 502 controls the verification of a user identifier during the login process and issues a session token to a requesting client system for enabling a secure access session between a requesting client system and a server system. It will be understood that authorization controller 502 may require authentication of an actual identity of a user for authorization of a secure access session. In addition, it will be understood that authorization controller 502 may maintain a database of issued session tokens further classified according to active and deactivated session tokens. Further, it will be understood that authorization controller 502 may follow server preferences in generating the session token, including but not limited to, preferences for expiration times for inactivity and overall expiration times.

In addition, in the example, login controller 500 includes a secure user database 504. Examples of multiple types of data included for each user are depicted. It will be understood that additional or alternate types of database may be included in entries for users in secure user database 504. In addition, it will be understood that secure user database 504 may be distributed across multiple systems.

For a user record in secure user database 504, a login identifier (ID) 506 may include both a general ID 508 and a travel ID 510. In one example, when a user logs in with travel ID 510, a personal session trigger controller 522 is initiated to trigger a personal session controller, identified in personal session service settings 518, to generate a personal token for the session. In one example, requests made by personal session trigger controller 522 to personal session controllers are recorded as personal token requests 524.

In addition, a user record in secure user database 504 includes a password 512. Password 512 may include text, voice, video, or biometric password samples that authorization controller 502 compares with a user password entry to determine whether to enable a secure session.

Further, a user record in secure user database 506 includes other user information 514, such as a user name, user address, user accounts, and other information that may be included in a session token or used by a server system. For example, where a user logs on to access a transactional service, the transactional service may automatically fill in fields within web pages with transactional forms with user interface 514.

In addition, a user record in secure user database 506 includes access levels 516. Access levels 516 specify the types of access allowed to a user and may further specify types of access allowed to a user based on the system at which a user logs in, a time of day of login, or other criteria.

In the example, a user record in secure user database 506 also includes personal session service settings 518, as previously described. Personal session service settings may include the network addresses for one or more systems enabled with personal session controller 400. In addition, personal session service settings 518 may specify rules for selecting which personal session controller to trigger.

In addition, in the example, login controller 500 may include a personal short-lived token controller 526. In one embodiment, personal short-lived token controller 526 generates a short-lived personal token that includes an executable with data including an expiration time, an issuing login controller and destruction settings. A user record may include short-lived personal token settings 520 that specify preferences for expiration times, destruction settings, and when to automatically trigger personal short-lived token controller 526 to generate a short-lived personal token. In one example, authorization controller 502 generates session tokens with a particular expiration time, however, a user may specify in short-lived personal token settings 520 to generate a short-lived personal token with a shorter expiration time for logins detected from a client system not identified as a client system of a particular enterprise network system. By directing login controller 500 or other service to generate and issue a short-lived personal token, a user may override the session security for particular logins.

Figure 6:
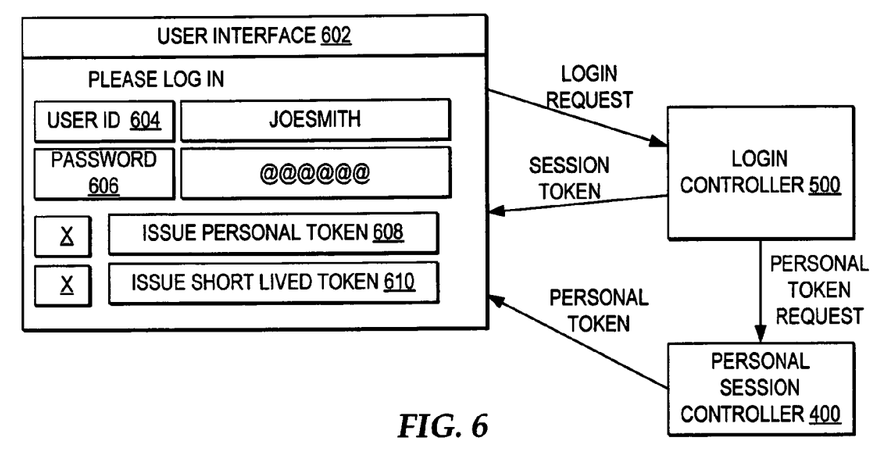
FIG. 6 is an illustrative diagram illustrating one example of a login that triggers generation of a personal token.

Referring now to FIG. 6, an illustrative diagram depicts one example of a login that triggers generation of a personal token. As illustrated, a user interface 602 includes a login prompting. In the example, the prompting includes a field 604 for entry of a user ID and a field 606 for entry of a password. It will be understood that in addition to a field for text entry of a user ID and password, additional promptings for other types of data entry, including a voice sample or other biometric data, may be included in user interface 602.

In addition, user interface 602 includes selectable options. In one example, a selectable option 608 enables a user to select to issue a personal token for the login-based session. In another example, a selectable option 610 enables a user to select to issue a short-lived personal token for the login-based session.

In one example, a user logs in with a general user ID and selects one of more of selectable options 608 and 610. The login request, with general user ID, password, and selected options from among issue of a personal token and issue of a short-lived personal token, are passed to login controller 500. Login controller 500 authorizes the user for a session and issues a session token to the requesting client system facilitating user interface 602. In addition, if a short-lived personal token is requested, login controller 500 may generate a short-lived personal token and issue the short-lived personal token (not depicted). Further, if a personal token is requested, login controller 500 sends a personal token request to a network address of personal session controller 400. Personal session controller 400 generates a personal token for the session for the particular user and issues the personal token to the requesting client system facilitating user interface 602.

Figure 7:
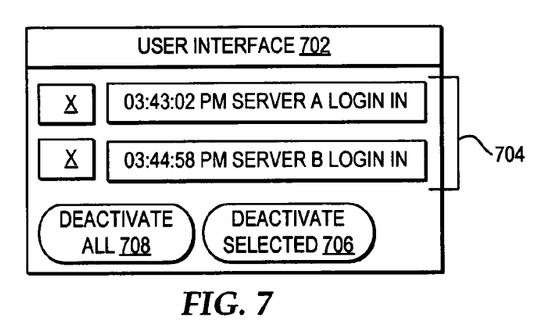
FIG. 7 is an illustrative diagram depicting one example of a user killing multiple login-based sessions with a single action.

Referring now to FIG. 7, an illustrative diagram depicts one example of a user killing multiple login-based sessions with a single action. In the example, a user interface 702 facilitated at a client system includes a selectable record for each active personal token, as indicated at reference numeral 704. In the example, as indicated at reference numeral 704, each of the two selectable records identifying a separate personal token includes a time of activation and a server at which the login occurred. In other examples, other types of information may identify each personal token.

In one example, a user may select particular records for particular active personal tokens and then, through the single action of selecting button 706, select to deactivate the selected personal tokens. In another example, a user may select button 708 with a single action, to select to deactivate all currently active personal tokens. With a user selection of either button 706 or button 708 through user interface 702, personal session controller 400 is triggered to deactivate the selected personal tokens.

Figure 8:
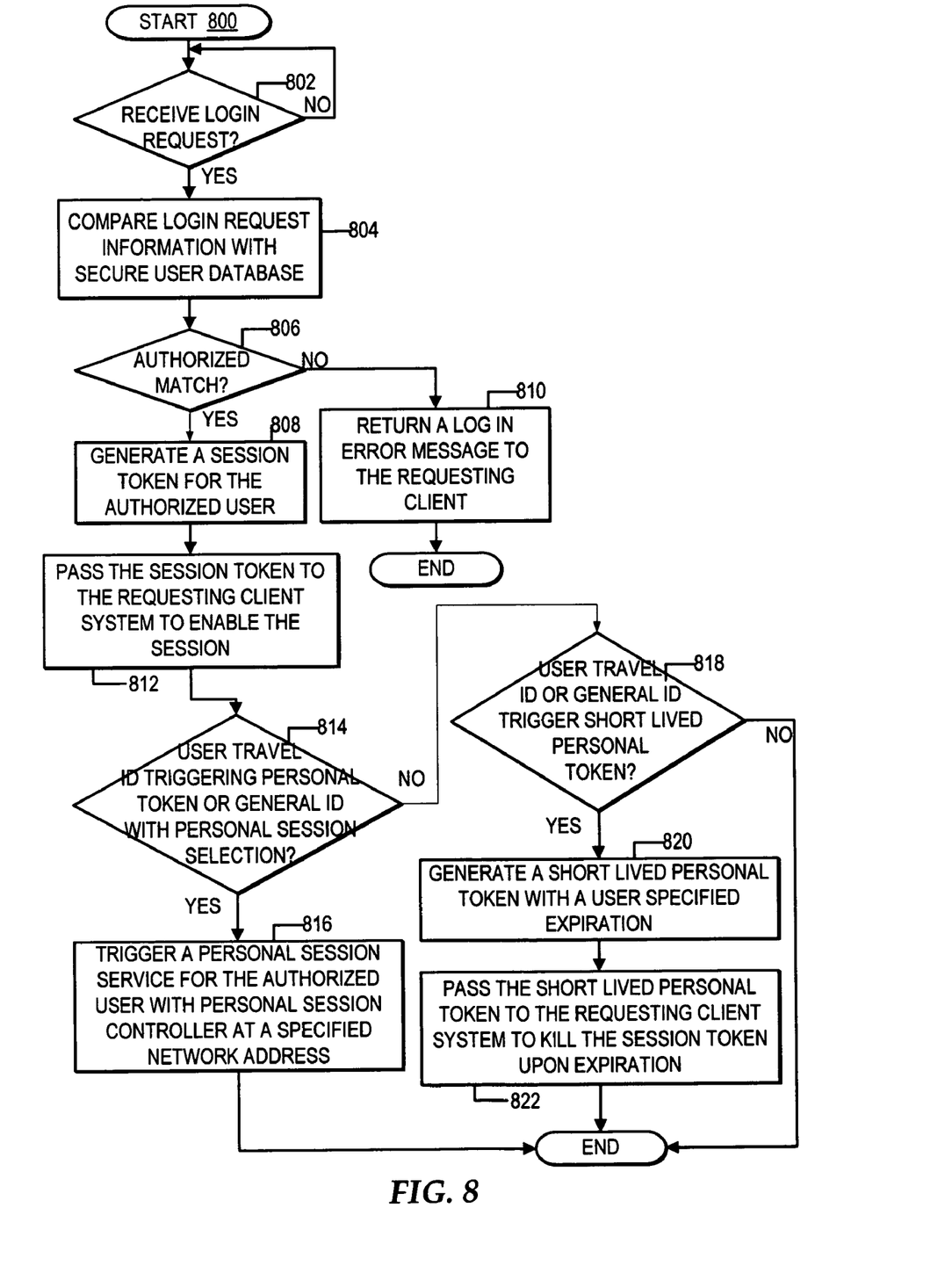
FIG. 8 is a high level logic flowchart illustrating a process and program for controlling a login enabled for triggering generation of personal tokens.

With reference now to FIG. 8, a high level logic flowchart illustrates a process and program for controlling a login enabled for triggering generation of personal tokens. As illustrated, the process starts at block 800 and thereafter proceeds to block 802. Block 802 depicts a determination by a login controller whether a login request is received. A login request may include a user ID, general or travel, and selections to trigger personal tokens or short-lived personal tokens. If the login controller detects a login request, then the process passes to block 804.

Block 804 depicts comparing the login request information with the secure user database. Next, block 806 illustrates a determination by the login controller whether there is an authorized match with the login request information. If there is not an authorized match, then the process passes to block 810. Block 810 depicts returning a log error message to the requesting client, and the process ends. Otherwise, at block 806, if there is an authorized match, the process passes to block 808.

Block 808 depicts the login controller generating a session token for the authorized user for a session. Next, block 812 depicts the login controller passing the session token to the requesting client system to enable the session, and the process passes to block 814.

Block 814 depicts a determination whether the login request includes the travel ID that according to preferences triggers a personal token or a general ID with personal session selection. If the login request includes a travel ID triggering a personal token or a general ID with personal session selection, then the process passes to block 816. Block 816 illustrates triggering a personal session service for the authorized user with the personal session controller at a specified network address, and the process ends.

Returning to block 814, if the login request does not include a travel ID that triggers a personal token or a general ID with a personal session selection, then the process passes to block 818. Block 818 depicts a determination whether the login request includes a travel ID or general ID that triggers a short-lived personal token. If the general ID or travel ID does not trigger a short-lived token trigger, then the process ends. Otherwise, at block 818 if the general ID or travel ID does trigger a short-lived personal token, according to login settings or the user short-lived token settings, then the process passes to block 820. Block 820 depicts generating a short-lived personal token for a user specified expiration rule. For example, a user may specify a time based expiration or a number of accesses based expiration. Next, block 822 illustrates passing the short-lived personal token to the requesting client system to kill the session token upon expiration of the short-lived personal token, and the process ends.

Figure 9:
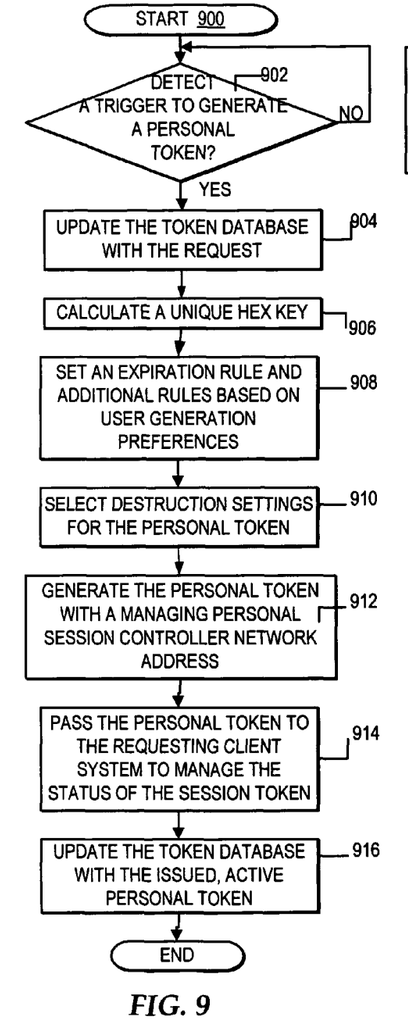
FIG. 9 is a high level logic flowchart depicting a process and program for generating and issuing personal tokens managed by a personal session controller

With reference now to FIG. 9, a high level logic flowchart depicts a process and program for generating and issuing personal tokens managed by a personal session controller. As illustrated, the process starts at block 900 and thereafter proceeds to block 902. Block 902 depicts a determination whether a personal session controller detects a trigger to generate a personal token. If a personal session controller detects a trigger to generate a personal token, then the process passes to block 904.

Block 904 depicts updating the token database with the request. Next, block 906 illustrates calculating a unique hex key for the personal token. Thereafter, block 908 depicts setting an expiration rule and additional rules based on user generation preferences. Next, block 1010 illustrates selecting destruction settings for the personal token. Block 912 depicts generating the personal token with the hex key, expiration and additional rules, and destruction settings, and the process passes to block 914.

Block 914 depicts passing the personal token to the requesting client system to manage the status of the session token. Next, block 1016 illustrates updating the token database with the issued, active personal token, and the process ends.

Figure 10:
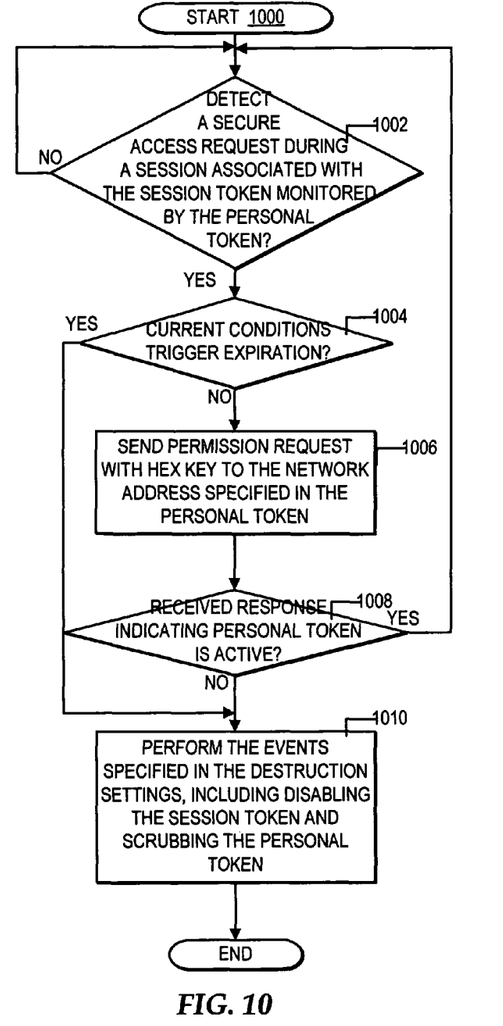
FIG. 10 is a high level logic flowchart illustrating a process and program for session token management as controlled by a personal token.

Referring now to FIG. 10, a high level logic flowchart depicts a process and program for session token management as controlled by a personal token. As depicted, in the example, the process starts at block 1000 and thereafter proceeds to block 1002. In one embodiment, the personal token self-activates and performs the steps described in FIG. 10. In another embodiment, the personal token is plugged into a network interface application that triggers the token.

Block 1002 depicts a determination whether the token detects a secure access request during a session associated with the session token monitored by the personal token. If a secure access request is detected, then the process passes to block 1004. Block 1004 depicts a determination whether the current conditions trigger expiration. For example, if the total number of secure accesses exceeds a user specified number or if the current time exceeds a user specified time limit, then the current conditions trigger expiration. If the current conditions trigger expiration, then the process passes to block 1010. Block 1010 depicts performing the events specified in the destruction settings, including, for example, disallowing the session token and scrubbing the personal token, and the process ends.

Returning to block 1004, if the current conditions do not trigger expiration, then the process passes to block 1006. Block 1006 depicts sending a permission request with the personal token hex key to the network address specified in the personal token. Next, block 1008 illustrates a determination whether a response received from the personal session controller indicates the personal token is active. If the personal token is active, then the process returns to block 1002. If the personal token is deactivated, then the process passes to block 1010.

Figure 11:
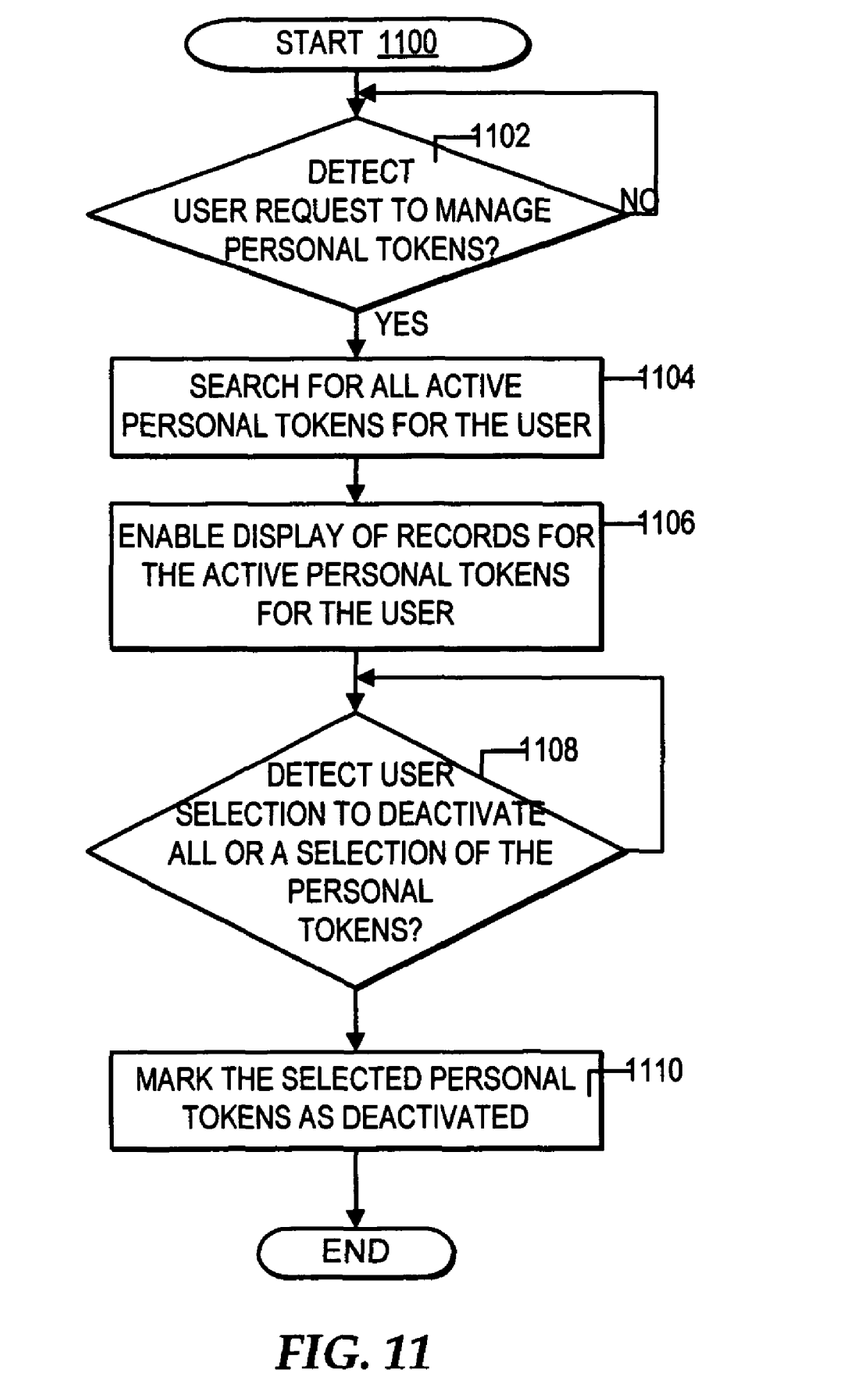
FIG. 11 is a high level logic flowchart depicting a process and program for enabling a user to kill active session tokens with a single action.

With reference now to FIG. 11, a high level logic flowchart illustrates a process and program for enabling a user to kill active session tokens with a single action. As illustrated, the process starts at block 1100 and thereafter proceeds to block 1102. Block 1102 depicts a personal session controller detecting a user request to manage personal tokens. A user request to manage personal tokens may include a login procedure for verifying an identity of a user requesting to manage the user's personal tokens. In addition, a user request to manage personal tokens may be automated to trigger periodic requests for updates to the currently active personal tokens. If the personal session controller detects a user request to manage personal tokens, then the process passes to block 1104. Block 1104 illustrates searching for all active personal tokens for the user. Next, block 1106 depicts enabling display of the records for the active personal tokens for the user. Thereafter, block 1108 depicts a determination whether the personal session controller detects a user selection to deactivate all or a selection of the personal tokens. If the personal session controller detects a user selection to deactivate all or a selection of the personal tokens, then the process passes to block 1110. Block 1110 depicts marking the selected personal tokens as deactivated, and the process ends.

While the invention has been particularly shown and described with reference to a preferred embodiment, it will be understood by those skilled in the art that various changes in form and detail may be made therein without departing from the spirit and scope of the invention.

What is claimed is:

1. A method for user-specified management of a plurality of separate login-based sessions via a network, wherein each said separate log in-based session is enabled by a separate session token issued to a separate client system from among a plurality of client systems from which a particular user logs in, wherein a separate server system from among a plurality of server systems authorizing each said separate login-based session issues each said separate session token to each separate client system from among said plurality of client systems to authorize access by said particular user to each said at least one server system, comprising:

responsive to detecting, at a personal session controller, authorization for each said separate login-based session for said particular user, separately issuing from said personal session controller a separate personal token to each said separate client system, wherein each said separate personal token comprises an executable script that when passed to each said separate client system executes on each separate client system to trigger each said separate client system to access said personal session controller via said network to request a status of said separate personal token while a date is less than an expiration date set in each said separate personal token and automatically disallows an associated separate session token at a particular client system if said personal session controller indicates said separate personal token status is deactivated or said date meets said expiration date; and enabling, by said personal session controller, an interface providing a selectable option for said particular user to direct said personal session controller to deactivate all of said separate personal tokens with a single action, such that said particular user accesses said personal session controller to manage each said separate login-based session independent of each said server system authorizing each said separate login-based session.

2. The method according to claim 1, further comprising:
responsive to detecting, at a login controller of a particular server system from among said plurality of server systems, a login request for said particular user from a particular client system from among said plurality of client systems, detecting a network address of said personal session controller from among a plurality of personal session controllers, wherein said personal session controller is specified for said particular user in a profile for said particular user comprising a login identifier and password for logging into said login controller and said network address; and
responsive to said login controller issuing a particular session token to said particular client system to authorize a particular login-based session, notifying said personal session controller at said network address of said authorization of said particular login-based session.

3. The method according to claim 1, further comprising:
responsive to detecting a login identifier for said particular user from a particular client system from among said plurality of client systems is one from among a travel login identifier and a regular login identifier with a personal token option selected, triggering said personal session controller to issue said separate personal token to said particular client system.

4. The method according to claim 1, wherein separately issuing from said personal session controller a separate personal token to each said separate client system further comprises:
separately issuing each said separate personal token with at least one expiration rule specified from a selection of expiration settings for said particular user, wherein each said separate personal token monitors at a receiving client system whether said expiration rule is triggered and automatically disallows said associated separate token at each receiving client system if said expiration rule is triggered.

5. The method according to claim 1, wherein separately issuing from said personal session controller a separate personal token to each said separate client system further comprises:
separately issuing each said separate personal token with at least one destruction setting specified from a selection of destruction settings for said particular user, wherein responsive to a separate executable script of each said separate personal token executing on each separate client system detecting said status as deactivated, said separate executable script of said separate personal token performs said destruction settings at each separate client system comprising closing all window open in association with said associated separate session token, destroying said associated separate session token, disallowing said separate personal token, and destroying said separate personal token.

6. The method according to claim 1, wherein enabling said particular user to access said personal session controller and to select to deactivate all of said separate personal tokens with a single action, further comprises:
detecting a login request by said particular user from a particular client system from among said plurality of client systems to said personal session controller;
authorizing said particular user for login to said personal session controller; and
issuing said particular user at said particular client system a particular session token for authorizing a login-based session between said particular client system and said personal session controller and issuing a particular personal session token for enabling user specified disallowance of said particular session token.

7. The method according to claim 6, further comprising:
responsive to logging said particular user in at said particular client system, monitoring said particular client system for at least one additional session token received at said particular client system from at least one other server system; and
responsive to detecting said additional session token received at said particular client system, automatically issuing an additional personal token to said particular client system for enabling user specified disallowance of said additional session token through said personal session controller.

8. A system for user-specified management of at least one separate login-based session via a network, comprising:
a plurality of server systems each comprising at least one processor for authorizing a plurality of separate login-based sessions via a network by issuing a separate session token via said network to each client system from among a plurality of client systems from which a particular user logs in to authorize access by said particular user to each said at least one server system;
a personal session controller comprising at least one processor communicatively connected to said network, responsive to detecting authorization for each said separate login-based session for said particular user, for separately issuing from said personal session controller a separate personal token to each said separate client system, wherein each said separate personal token comprises an executable script that when passed to each said separate client system executes on each separate client system to trigger each said separate client system to access said personal session controller via said network to request a status of said separate personal token while a date is less than an expiration date set in each said separate personal token and automatically disallows an associated separate session token at a particular client system if said personal session controller indicates said separate personal token status is deactivated or said date meets said expiration date; and
said personal session controller for enabling an interface providing a selectable option for said particular user to direct said personal session controller to deactivate all of said separate personal tokens with a single action, such that said particular user accesses said personal session controller to manage each said separate login-based session independent of each said server system authorizing each said separate login-based session.

9. The system according to claim 8, further comprising:
a login controller communicatively connected to said network, wherein said login controller further comprises:
means, responsive to detecting, at a login controller of a particular server system from among said plurality of server systems, a login request for said particular user from a particular client system from among said plurality of client systems, for detecting a network address of said personal session controller from among a plurality of personal session controllers, wherein said personal session controller is specified for said particular user in a profile for said particular user comprising a login identifier and password for logging into said login controller and said network address; and means, responsive to said login controller issuing a particular session token to said particular client system to authorize a particular login-based session, for notifying said personal session controller at said network address of said authorization of said particular login-based session.

10. The system according to claim 8, said personal session controller further comprising:
means, responsive to detecting a login identifier for said particular user from a particular client system from among said plurality of client systems is one from among a travel login identifier and a regular login identifier with a personal token option selected, for triggering issue of said separate personal token to said particular client system.

11. The system according to claim 8, said personal session controller further comprising:
means for separately issuing each said separate personal token with at least one expiration rule specified from a selection of expiration settings for said particular user, wherein each said separate personal token monitors at a receiving client system whether said expiration rule is triggered and automatically disallows said associated separate token at each receiving client system if said expiration rule is triggered.

12. The system according to claim 8, said personal session controller further comprising:
means for separately issuing each said separate personal token with at least one destruction setting specified from a selection of destruction settings for said particular user, wherein responsive to a separate executable script of each said separate personal token executing on each separate client system detecting said status as deactivated, said separate executable script of said separate personal token performs said destruction settings at each separate client system comprising closing all window open in association with said associated separate session token, destroying said associated separate session token, disallowing said separate personal token, and destroying said separate personal token.

13. The system according to claim 8, said personal session controller further comprising:
a login controller for detecting a login request by said particular user from a particular client system from among said plurality of client systems to said personal session controller, authorizing said particular user for login to said personal session controller, and issuing said particular user at said particular client system a particular session token for authorizing a login-based session between said particular client system and said personal session controller and issuing a particular personal session token for enabling user specified disallowance of said particular session token.

14. The system according to claim 13, said personal session controller further comprising:
means, responsive to logging said particular user in at said particular client system, for monitoring said particular client system for at least one additional session token received at said particular client system from at least one other server system; and
means, responsive to detecting said additional session token received at said particular client system, for automatically issuing an additional personal token to said particular client system for enabling user specified disallowance of said additional session token through said personal session controller.

15. A computer executable program product for user-specified management of at least one separate login-based session via a network, said computer executable program product embodied in a computer-readable storage medium and comprising computer-executable instructions which cause a computer to perform the steps of:
authorizing, by a plurality of server systems a plurality of separate login-based sessions via a network by issuing a separate session token via said network to each client system from among a plurality of client systems from which a particular user logs in to authorize access by said particular user to each said at least one server system;
responsive to detecting, at a personal session controller, authorization for each said separate login-based session for said particular user, separately issuing from said personal session controller a separate personal token to each said separate client system, wherein each said separate personal token comprises an executable script that when passed to each said separate client system executes on each separate client system to trigger each said separate client system to access said personal session controller via said network to request a status of said separate personal token while a date is less than an expiration date set in each said separate personal token and automatically disallows an associated separate session token at a particular client system if said personal session controller indicates said separate personal token status is deactivated or said date meets said expiration date; and
enabling an interface providing a selectable option for said particular user to direct said personal session controller to deactivate all of said separate personal tokens at said personal session controller with a single action, such that said particular user accesses said personal session controller to manage each said separate login-based session independent of each said server system authorizing each said separate login-based session.

16. The program product according to claim 15, further comprising:
responsive to detecting, at a login controller of a particular server system from among said plurality of server systems, a login request for said particular user from a particular client system from among said plurality of client systems, detecting a network address of said personal session controller from among a plurality of personal session controllers, wherein said personal session controller is specified for said particular user in a profile for said particular user comprising a login identifier and password for logging into said login controller and said network address; and
responsive to said login controller issuing a particular session token to said particular client system to authorize a particular login-based session, notifying said personal session controller at said network address of said authorization of said particular login-based session.

17. The program product according to claim 15, further comprising:
responsive to detecting a login identifier for said particular user from a particular client system from among said plurality of client systems is one from among a travel login identifier and a regular login identifier with a personal token option selected, triggering issue of said separate personal token to said particular client system.

18. The program product according to claim 15, wherein separately issuing a separate personal token to each said separate client system further comprises:
separately issuing each said separate personal token with at least one expiration rule specified from a selection of expiration settings for said particular user, wherein each said separate personal token monitors at a receiving client system whether said expiration rule is triggered and automatically disallows said associated separate token at each receiving client system if said expiration rule is triggered.

19. The program product according to claim 15, wherein separately issuing from said personal session controller a separate personal token to each said separate client system further comprises:

separately issuing each said separate personal token with at least one destruction setting specified from a selection of destruction settings for said particular user, wherein responsive to a separate executable script of each said separate personal token executing on each separate client system detecting said status as deactivated, said separate executable script of said separate personal token performs said destruction settings at each separate client system comprising closing all window open in association with said associated separate session token, destroying said associated separate session token, disallowing said separate personal token, and destroying said separate personal token.

20. The program product according to claim 15, wherein enabling said particular user to access said personal session controller and to select to deactivate all of said separate personal tokens with a single action, further comprises:

detecting a login request by said particular user from a particular client system from among said plurality of client systems to said personal session controller;

authorizing said particular user for login to said personal session controller; and issuing said particular user at said particular client system a particular session token for authorizing a login-based session between said particular client system and said personal session controller and issuing a particular personal session token for enabling user specified disallowance of said particular session token.

* * * * *